US008990725B2

(12) United States Patent
Worrall et al.

(10) Patent No.: US 8,990,725 B2
(45) Date of Patent: Mar. 24, 2015

(54) SYSTEM AND METHOD FOR PROCESSES ENABLED BY METADATA ASSOCIATED WITH DOCUMENTS WITHIN A BINDER FILE

(75) Inventors: Eric Worrall, March (GB); Derek W. Pool, Herts (GB)

(73) Assignee: Global Graphics Software Limited, Cambourne, Cambridge (GB)

( * ) Notice: Subject to any disclaimer, the term of this patent is extended or adjusted under 35 U.S.C. 154(b) by 934 days.

(21) Appl. No.: 12/879,329

(22) Filed: Sep. 10, 2010

(65) Prior Publication Data

US 2011/0066966 A1 Mar. 17, 2011

Related U.S. Application Data

(60) Provisional application No. 61/241,733, filed on Sep. 11, 2009, provisional application No. 61/241,722, filed on Sep. 11, 2009, provisional application No. 61/241,739, filed on Sep. 11, 2009.

(51) Int. Cl.
  *G06F 3/048* (2013.01)
  *G06F 17/30* (2006.01)
  *G06F 17/21* (2006.01)

(52) U.S. Cl.
  CPC ........ *G06F 17/30011* (2013.01); *G06F 17/211* (2013.01)
  USPC .......................................................... 715/776

(58) Field of Classification Search
  CPC . G06F 3/0483; G06F 3/0485; G06F 15/0283; G06F 3/04883; G06F 3/03547
  USPC .......................................................... 715/766
  See application file for complete search history.

(56) References Cited

U.S. PATENT DOCUMENTS 5,392,387 A 2/1995 Fitzpatrick et al.
5,542,040 A 7/1996 Chang et al.
(Continued)

FOREIGN PATENT DOCUMENTS

WO 92/08199 A1 5/1992

OTHER PUBLICATIONS

U.S. Appl. No. 12/879,301, filed Sep. 10, 2010.
(Continued)

*Primary Examiner* — Jennifer To
*Assistant Examiner* — James G Pohlman
(74) *Attorney, Agent, or Firm* — Lowe Graham Jones PLLC; Bruce E. Black

(57) ABSTRACT

A method of presenting documents includes providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file if the document has been updated, wherein each document has been created individually and added to the single file. The method further includes updating the single file using a computer application program to, without user intervention, review the time indicator of at least one of the plurality of documents in the single file and update that document if an updated version of that document is available to the computer application program; displaying a graphical interface that appears as a notebook binder; and displaying a portion of at least one of the plurality of documents on a graphical page of the notebook binder of the graphical interface.

18 Claims, 5 Drawing Sheets

(56) References Cited

U.S. PATENT DOCUMENTS

| | | | |
|---|---|---|---|
| 5,581,686 A | 12/1996 | Koppolu et al. | |
| 5,640,579 A | 6/1997 | Koppolu et al. | |
| 5,778,352 A | 7/1998 | Inoue et al. | |
| 5,950,216 A * | 9/1999 | Amro et al. | 715/209 |
| 6,014,140 A * | 1/2000 | Strand | 345/684 |
| 6,026,416 A * | 2/2000 | Kanerva et al. | 715/208 |
| 6,061,696 A | 5/2000 | Lee et al. | |
| 6,370,553 B1 * | 4/2002 | Edwards et al. | 715/234 |
| 6,523,048 B2 | 2/2003 | DeStefano | |
| 6,809,748 B2 | 10/2004 | Watanabe et al. | |
| 7,051,036 B2 | 5/2006 | Rosnow et al. | |
| 7,114,128 B2 | 9/2006 | Koppolu et al. | |
| 7,174,504 B2 * | 2/2007 | Tsao | 715/255 |
| 7,268,909 B2 | 9/2007 | Nakagiri | |
| 7,571,425 B2 | 8/2009 | Lessly | |
| 7,590,807 B2 * | 9/2009 | McGovern et al. | 711/159 |
| 7,770,180 B2 | 8/2010 | Villaron et al. | |
| 7,996,436 B2 | 8/2011 | Schneider et al. | |
| 8,054,496 B1 * | 11/2011 | Rehfeld | 358/1.18 |
| 8,468,441 B2 | 6/2013 | Cory | |
| 2001/0003186 A1 | 6/2001 | DeStefano | |
| 2002/0065849 A1 * | 5/2002 | Ferguson et al. | 707/513 |
| 2002/0099741 A1 | 7/2002 | Watanabe et al. | |
| 2002/0118230 A1 * | 8/2002 | Card et al. | 345/776 |
| 2003/0106039 A1 | 6/2003 | Rosnow et al. | |
| 2003/0198929 A1 | 10/2003 | Stuppy | |
| 2004/0044693 A1 * | 3/2004 | Hadley et al. | 707/200 |
| 2004/0158655 A1 | 8/2004 | Kremer | |
| 2004/0179231 A1 | 9/2004 | Savino et al. | |
| 2004/0184106 A1 | 9/2004 | Ferlitsch | |
| 2005/0102610 A1 | 5/2005 | Jie | |
| 2005/0134871 A1 | 6/2005 | Nakagiri | |
| 2005/0193330 A1 | 9/2005 | Peters | |
| 2005/0198565 A1 * | 9/2005 | McChrystal | 715/511 |
| 2005/0246631 A1 | 11/2005 | Mori et al. | |
| 2005/0267894 A1 | 12/2005 | Camahan | |
| 2006/0112399 A1 | 5/2006 | Lessly | |
| 2006/0132813 A1 | 6/2006 | Mitani et al. | |
| 2007/0070415 A1 | 3/2007 | Minato | |
| 2007/0130177 A1 | 6/2007 | Schneider et al. | |
| 2007/0253020 A1 * | 11/2007 | Hull et al. | 358/1.15 |
| 2010/0211515 A1 | 8/2010 | Woodings et al. | |
| 2011/0063666 A1 | 3/2011 | Worrall | |
| 2011/0066932 A1 | 3/2011 | Worrall | |

OTHER PUBLICATIONS

U.S. Appl. No. 12/879,349, filed Sep. 10, 2010.
Official Communication for U.S. Appl. No. 12/879,301 mailed Mar. 17, 2014.
Official Communication for U.S. Appl. No. 12/879,349 mailed Aug. 15, 2012.
Official Communication for U.S. Appl. No. 12/879,301 mailed Mar. 28, 2012.
Official Communication for U.S. Appl. No. 12/879,301 mailed Aug. 28, 2012.
Official Communication for U.S. Appl. No. 12/879,301 mailed Dec. 12, 2012.
Official Communication for U.S. Appl. No. 12/879,301 mailed Oct. 11, 2013.
Official Communication for U.S. Appl. No. 12/879,349 mailed Dec. 11, 2012.
Official Communication for U.S. Appl. No. 12/879,349 mailed Jun. 19, 2013.
"How to make a 'proper' PDF file Windows XP," Biochemistry, University of Wisconsin-Madison, Aug. 10, 2012, http://www.biochem.wisc.edu/medialab/tutorials/pdf_wintel.aspx.
Shea, Dan, "Planet PDF—Insert pages into existing PDF documents with Acrobat," May 1, 2008; http://www.planetpdf.com/enterprise/article.asp?ContentID=Insert_pages_into+existing_P . . . downloaded Dec. 8, 2012.
Windows Microsoft Corporation, "Print to file," 2012; http://windows.microsoft.com/en-us/windows-vista/Print-to-file downloaded Aug. 10, 2012.

* cited by examiner

SYSTEM AND METHOD FOR PROCESSES ENABLED BY METADATA ASSOCIATED WITH DOCUMENTS WITHIN A BINDER FILE

CROSS-REFERENCE TO RELATED APPLICATIONS

This patent application claims the benefit of U.S. Provisional Patent Application Ser. Nos. 61/241,733; 61/241,722; and 61/241,739, all of which were filed on Sep. 11, 2009, all of which are incorporated herein by reference.

BACKGROUND

Many people who use computers in their day-to-day business are not computer experts. It would often be counterproductive to require them to be; they are needed for their other skills. As a result one of the challenges in designing software applications that will be used on computer workstations is to ensure that the users of such software can perform the tasks of their jobs rapidly and efficiently. If the user interface for an application is complex or confusing then an organization may provide significant training for their employees to use the application and may supply help desk personnel to deal with queries and problems; both of which may reduce productivity and increase the total cost of using the software.

Over the past few decades it has become commonplace to represent page-based documents on a computer display in a roughly consistent way, often as a more-or-less white rectangle with the same aspect ratio as a printed page, shown against a gray, black or colored background. As a result of consistent usage computer users are now familiar with this representation of a simple stream of pages. In the same way the use of scroll bars and "page up" and "page down" keys has become a part of the baseline knowledge that new staff may be expected to already understand. These commonly understood representations and methods of interaction do not, however, extend to a more complex collection of documents that is more than a simple, ordered, sequence of pages.

BRIEF SUMMARY

One embodiment is a method of presenting documents including providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file if the document has been updated, wherein each document has been created individually and added to the single file. The method further includes updating the single file using a computer application program to, without user intervention, review the time indicator of at least one of the plurality of documents in the single file and update that document if an updated version of that document is available to the computer application program; displaying a graphical interface that appears as a notebook binder; and displaying a portion of at least one of the plurality of documents on a graphical page of the notebook binder of the graphical interface.

Another embodiment is a method of presenting documents including providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file or added to the single file if that document has not be updated, wherein each document has been created individually and added to the single file. The method further includes selecting a cut-off date; updating the single file by using a computer application program to, without user intervention, review the time indicator at least one of the plurality of documents in the single file and delete that document if the time indicator of that document is prior to the cut-off date; displaying a graphical interface that appears as a notebook binder; and displaying a portion of at least one of the plurality of documents on a graphical page of the notebook binder of the graphical interface.

Yet another embodiment is a computer readable storage medium having processor-executable instructions, the processor-executable instructions when installed onto a system enable the system to perform actions. The actions include providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file if the document has been updated, wherein each document is created individually and added to the single file, wherein each document is created individually and added to the single file. The actions further include updating the single file using a computer application program to, without user intervention, review the time indicator of at least one of the plurality of documents in the single file and update that document if an updated version of that document is available to the computer application program; displaying a graphical interface that appears as a notebook binder; and displaying a portion of at least one of the plurality of documents on a graphical page of the notebook binder of the graphical interface.

A further embodiment is a computer readable storage medium having processor-executable instructions, the processor-executable instructions when installed onto a system enable the system to perform actions. The actions include providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file or added to the single file if that document has not be updated, wherein each document has been created individually and added to the single file. The actions further include selecting a cut-off date; updating the single file by using a computer application program to, without user intervention, review the time indicator at least one of the plurality of documents in the single file and delete that document if the time indicator of that document is prior to the cut-off date; displaying a graphical interface that appears as a notebook binder; and displaying a portion of at least one of the plurality of documents on a graphical page of the notebook binder of the graphical interface.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of computing device that includes a processor or any combination of computing devices where each device performs at least part of the process.

Suitable computing devices typically include mass memory and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Methods of communication can include both wired and wireless (e.g., RF, optical, or infrared) communications methods and such methods provide another type of computer readable media; namely communication media. Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 1:
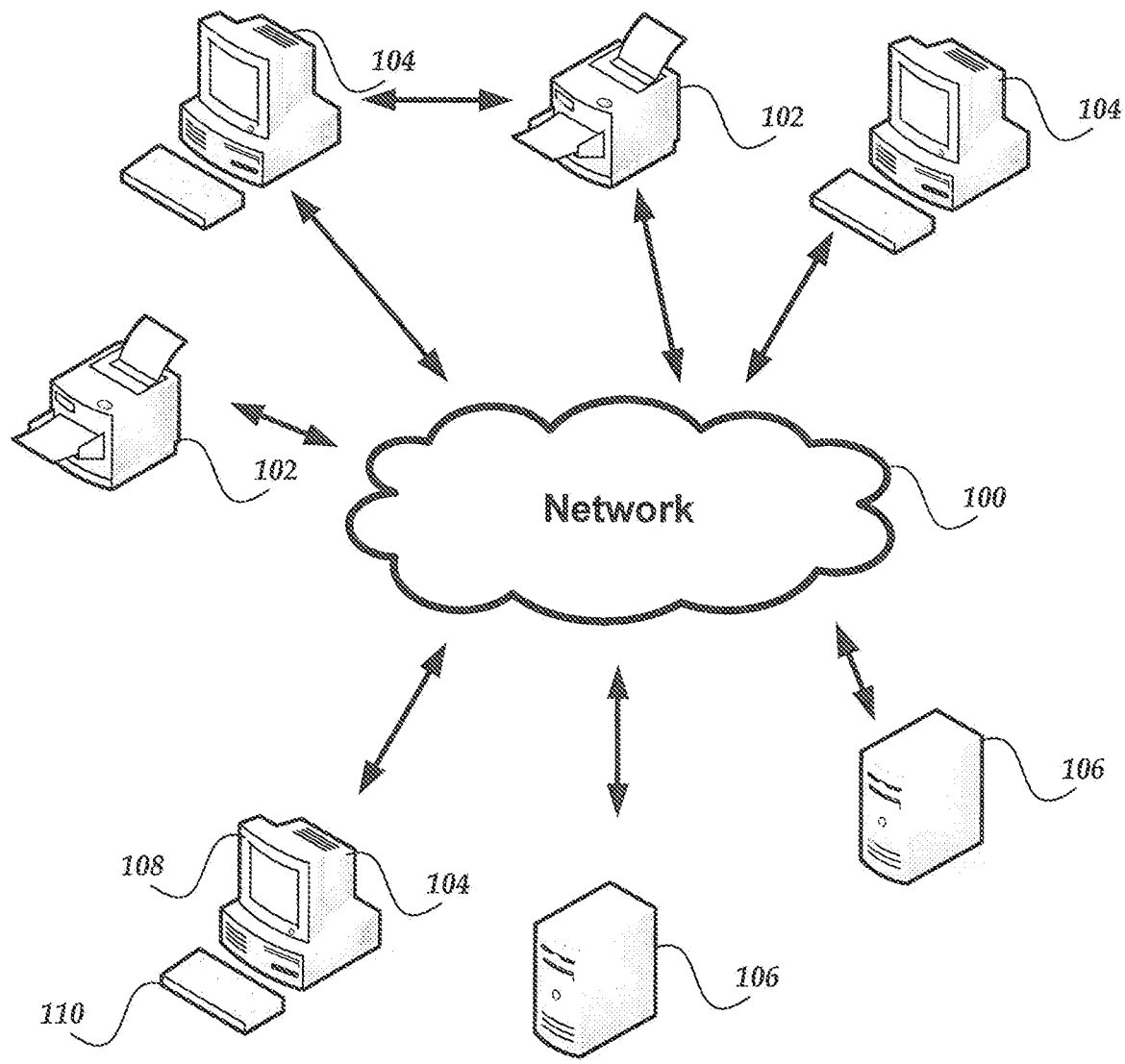
FIG. 1 is a schematic representation of one embodiment of an environment in which the invention can be employed.

FIG. 1 illustrates one embodiment of an environment for the invention. In FIG. 1, a network environment is illustrated, but it will be understood that the invention is also applicable to unnetworked computing devices as well. It will be understood that the network environment can be a local area network, a wide area network, or any combination thereof. It will also be understood that the network can include devices, other than those illustrated, coupled to the network and that there may be multiple devices of each type illustrated connected to the network. The illustrated environment includes a network 100 to which is attached, either directly or through other devices, one or more computing devices 104 (e.g., computers, workstations, and the like), one or more printers 102, and one or more servers 106. Other devices can optionally be attached to the network such as personal data assistants (PDA's), cameras, cellular telephones, portable storage devices (e.g., compact discs, DVDs, memory sticks, flash drives, or other optical or magnetic storage media), and the like. Any of these devices can be connected directly to the network or via another device such as a computing device 104, printer 102, or server 106. A computing device 104 typically includes a display 108 and one or more input devices 110, such as a keyboard, mouse, trackball, and the like. The computing device will also typically include internal components, such as a processor, a mass memory, and one or more components for reading portable computer-readable media, as described above.

Storage and presentation of related documents together is one method of increasing efficiency. In the office and other environments, physical documents are often collected into physical binders (using, for example, a ring-binder, lever-arch binder, comb- or ring-binding) for storage and reference. Often the documents within the binder are divided into sections, where each section contains different classes (e.g., different subject matter or different type) of document. As an example a home user may file utility bills into a binder with electricity in one section, telephone bills into another section, and so on. Similarly, an accounts clerk may file invoices relating to different suppliers or different date ranges into separate sections. To provide a clear demarcation between the sections, and to allow for easy navigation when searching for a document within the binder, dividers may be used between the sections. Such dividers may be made from a heavier or stiffer medium than that on which the regular pages are printed, may be colored and may include a tab that extends beyond the edges of the pages of the documents within the binder. Each of these characteristics enables the division between sections to be found more easily and quickly.

Electronic documents are increasingly ubiquitous in business environments. When multiple documents are accessed together they can be organized in a variety of ways, including storage in a hierarchy of directories or folders on a computer, or by a conduit into a content management system running at the organization or department level. In at least some circumstances, there is value in maintaining a single file that contains a hierarchical document structure in a way that is easy to transfer between users while making it difficult to accidentally separate the constituent documents. Such a file will be referred to herein as a 'binder file'. The binder file format is described in the U.S. Provisional Patent Application Ser. No. 61/241,722 entitled "System and Method for Providing a Representation of Hierarchical Structures of Documents", filed on even date herewith, and incorporated herein by reference. A method and system for updating and extending binders is described in "System and Method for Amending and Extending Hierarchical Structures of Documents", Ser. No. 61/241,739, filed on even date herewith, and incorporated herein by reference.

Figure 2:
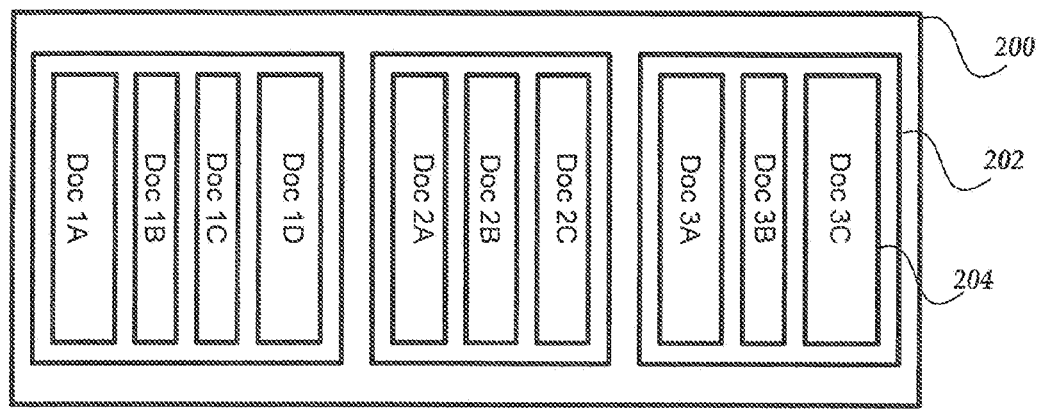
FIG. 2 is a schematic conceptualization of one embodiment of a binder file, according to the invention.

In at least some embodiments, the file with a binder format can be used to store multiple 'documents' within 'sections' within a single 'binder' file. FIG. 2 conceptually illustrates this concept with a binder file 200 containing multiple sections 202 with documents 204 distributed within the sections. It will be understood the three level hierarchy of document/section/binder is not exclusive and that the binder display metaphor may be extended to other depths, for example, by the depiction of sections and subsections.

Figure 3:
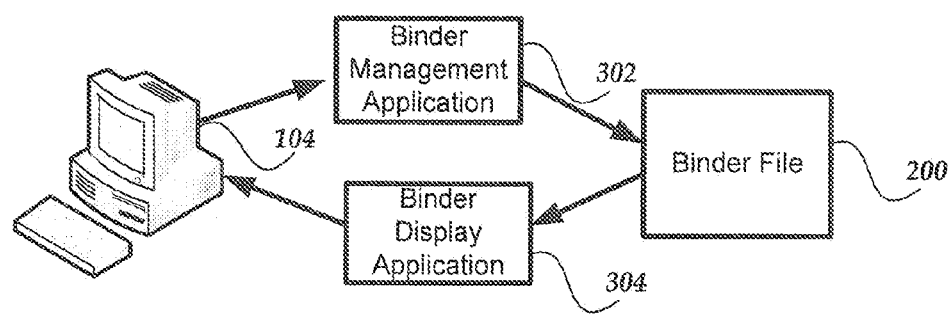
FIG. 3 is a schematic representation of elements of one embodiment of a system for management and display of content of a binder file, according to the invention.

As illustrated in FIG. 3, the binder file 200 can be created and modified using a binder management application 302. The binder file 200 can be displayed on a computing device 104 using a binder display application 304. It will be understood that the binder management application 302 and binder display application 304 can be components of a single software application or can be separate applications. Moreover, the binder management application 302 and binder display application 304 may reside on the same computing device or may reside on different devices or even divided among any number of different application. For example, a binder file 200 may be generated using the binder management application 302 on one computing device or using an external server and then imported to another computing device or server for display using the binder display application 304. In some instances, components of either or both of the binder management application and binder display application may reside on different computing devices or servers.

Within the binder file each document and section has metadata associated with it. Additional metadata may also be associated with the binder file as a whole. The specific set of metadata used may vary from one embodiment to another or may be configured by a user of an embodiment. For example, the metadata may include one more of the following: an identifier for each document (e.g., a number or a title for each document); an indicator in which section a document belongs; a locator for each document designating a defined position within a section; a label for each section (and possibly additional identification such as a color); or the order of sections within the binder. Other metadata may also be included for one or more (or even each) document, section, or binder such as creator or author name(s); creation date; identification of the source document from which this document within the binder was imported (as a directory/file path or as an identifier within a content management system or other infrastructure repository); the time/date at which the document or section was last modified; the time/date at which the document or section was created or added to the binder; a time/date in the future by which some activity must be performed; a table of contents for the binder; binder name; the storage location of one or more copies of the binder file (e.g., to allow for automatic updating of the copies when the binder file is altered); alternate document or section titles; recipient name(s) or title(s); keyword(s); and other items such as those described by the Dublin Core Metadata Initiative or that may be desirable for a specific use case.

There are a number of different methods for associating metadata with a documents, section, or file. For example, metadata items may be generated automatically at the time of creation or editing of the binder, section or document. Metadata items may be automatically derived from a precursor representation of a document at the time that the binder is created or a document is added to an existing binder. Metadata items may be entered manually by a computer user or derived from some other external source. It will be understood that these methods may be used exclusively or in combination for any particular set of metadata or any particular metadata item.

Figure 4:
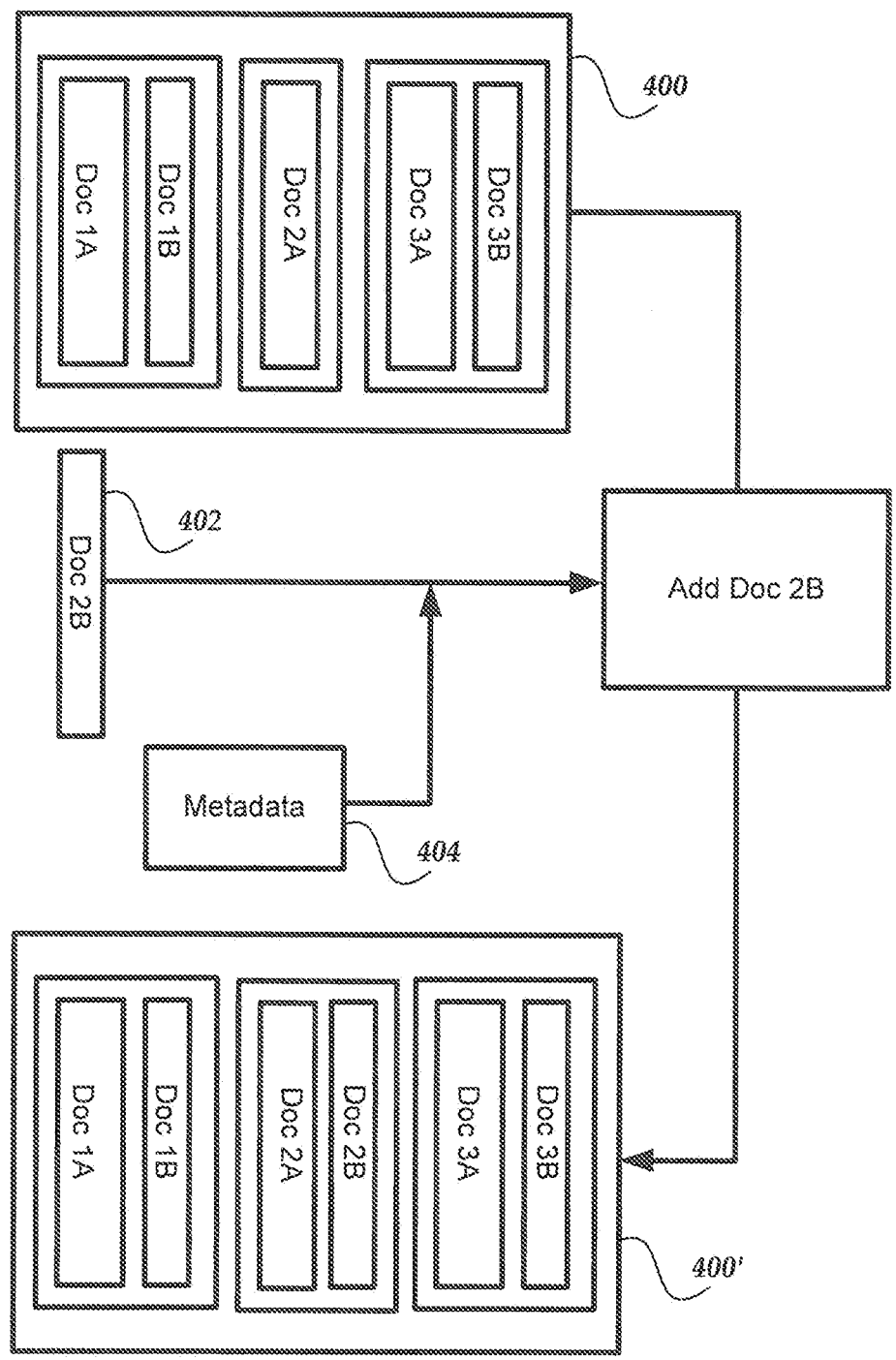
FIG. 4 is a schematic representation of one embodiment of a method of adding a document to a binder file, according to the invention.

FIG. 4 schematically illustrates one embodiment of a method of adding a new document 402 to a binder file 400 to create a modified binder file 400' that includes the new document. Metadata 404 is included with the new document 402 in the modified binder file 400'. The metadata for the file may be generated automatically or manually or any combination thereof. For example, metadata such as the time and date of addition to the binder can be automatically generated by the application. Metadata, such as creation date, creator(s), title, and location of the source document can be automatically generated from the document file itself. Metadata, such as the section into which the document is placed or the document title, may be manually entered by the user.

The availability of such metadata can allow a computer application, such as a binder maintenance application or a binder display application, to include useful features that utilize the metadata. Such features may be configured to operate automatically (e.g., periodically) or without user request or intervention (although the frequency of such operations may be user-definable), to operate when initiated by a user (and, at least in some embodiments, without further user intervention), or to be performed manually by a user. An embodiment of a binder maintenance application or a binder display application may include one or more of the features described herein.

One example of a useful feature is the ability to print all documents within a binder or section that have been changed (or, in some embodiments, added) since a revision date. The selection of the revision date may be automatic or made by a user. This may be useful to, for example, prepare a loose-leaf update to a physical copy of the software binder or to provide a set of modified documents for a meeting or presentation. This feature might be performed periodically or at user request.

Another useful feature is the ability to delete all documents within a binder or section that have not been changed since a certain date. This feature can be used to, for example, purge documents that are no longer relevant or documents that are beyond a document retention period (e.g., four, five, six, or ten years.) In some embodiments, a cut-off date is established. The cut-off date can be selected automatically (e.g., a date that is a selected period prior to the current date) or selected by a user. Documents with a date (e.g., one or more of the date last modified or date created or date added to the binder file) older than the cut-off date are purged. In at least some embodiments, a user may designate documents that are not to be purged regardless of the date of the document. Alternatively, a user may designate those documents that might be purged; the rest of the documents being exempt from purging regardless of date.

Yet another useful feature is the ability to update a single document, all documents in a section, or all documents in a whole binder from later versions of the source documents from which they were originally imported. This feature can be used automatically or upon user initiation to maintain an updated set of documents. In some embodiments, the application may also replace one or more copies of the binder files stored on other computing devices or servers. In at least some embodiments, a user may designate documents that are not to be updated regardless whether an updated version of the document exists. Alternatively, a user may designate those documents that might be updated; the rest of the documents being exempt from updating regardless of date.

Another useful feature is the ability to generate a change history for the binder, or for a section within it. This ability may be automatic when the binder file is altered (e.g., when one or more documents are added, updated, or modified or when metadata is added or modified) or may be initiated by a user.

Yet another useful feature is the ability to create or update a table of contents for the binder as a whole using tables of contents within each document and knowledge of the binder hierarchy. Again, this ability may be automatic when the binder file is altered (e.g., when one or more documents are added, updated, or modified or when metadata is added or modified) or may be initiated by a user.

Another useful feature is the ability to hide all documents within a binder or section that are older than a set time (optionally with a feature that enables them to be revealed again.) The selection of the set time may be automatic or made by a user. This can be useful, for example, in review of the binder or in meetings or presentations to highlight more recent information.

The binder file, or portions of the binder file such as individual documents, sets of documents, or and sections, may have business rules associated with it. These business rules may enable automated processing of documents within the binder. For example, the business rules may include automated rules utilizing the features described above. Business rules may be utilized to reminding a user that a deadline for an activity such as filling in and submitting a form or the whole binder is approaching. Business rules may be used to hide all pre-existing documents within a section when a new document is added to that section (optionally with a mechanism to enable the hidden documents to be revealed again, thus holding a secure audit trail of updates to that section.) Business rules can be used to automatically update a document within the binder from later versions of the source document from which it was originally imported at some defined time interval.

Figure 5:
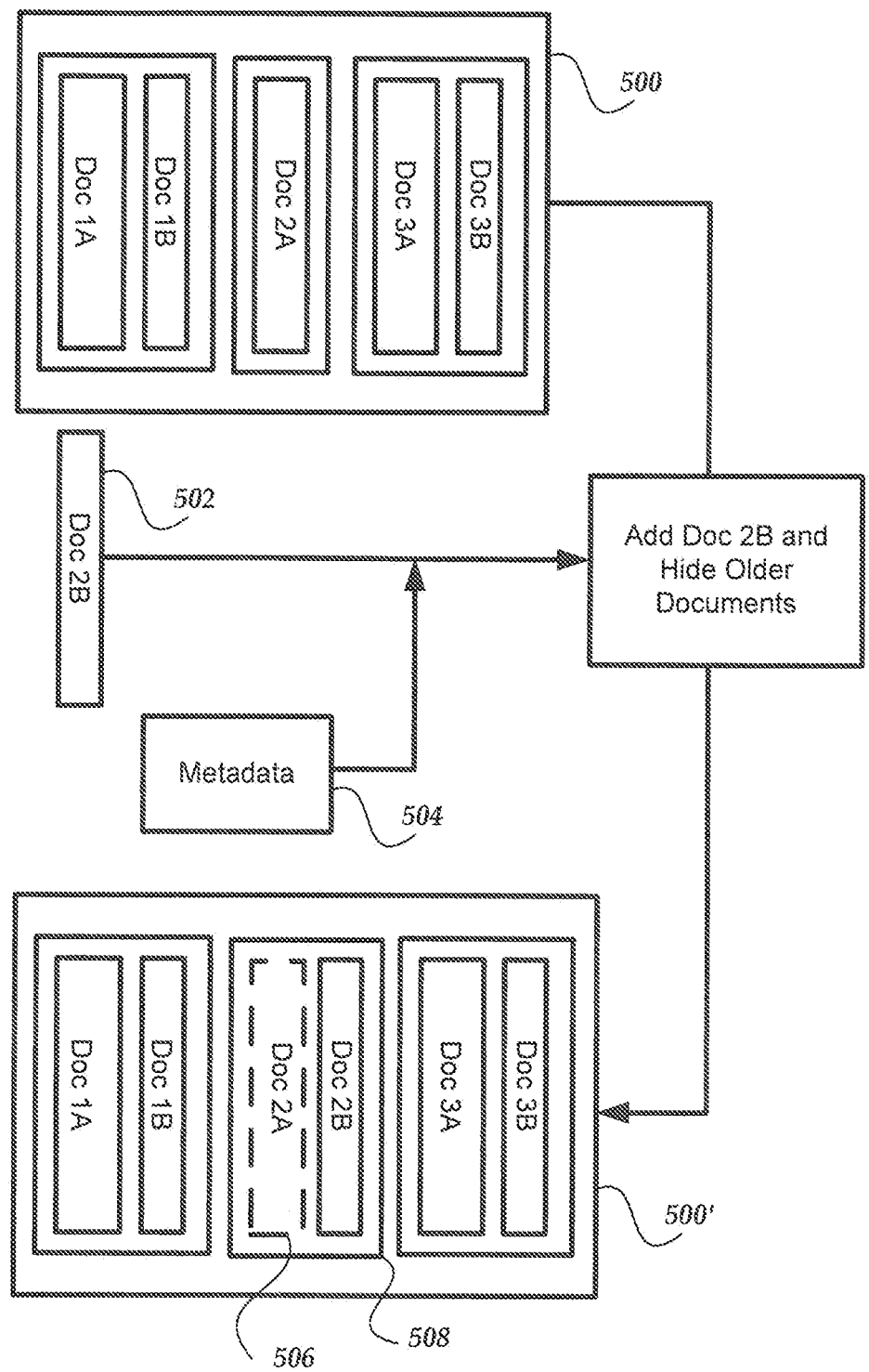
FIG. 5 is a schematic representation of one embodiment of a method of adding a document to a binder file and the hiding of other documents in the section to which the document is added, according to the invention.

FIG. 5 is a schematic representation of one such rule based on the addition of a new document 502 and metadata 504 to the binder file 500 to form a modified binder file 500'. In this example the pre-existing binder file 500 has business rules attached to at least section 508 that instruct the binder maintenance application to retain, but hide, all pre-existing documents (e.g., document 506) in that section when a new document is added. In this schematic representation, the user requests that a new document 502 is added into section 508. The binder maintenance application inserts the new document 502 into section 508 and hides old document 506.

Figure 6:
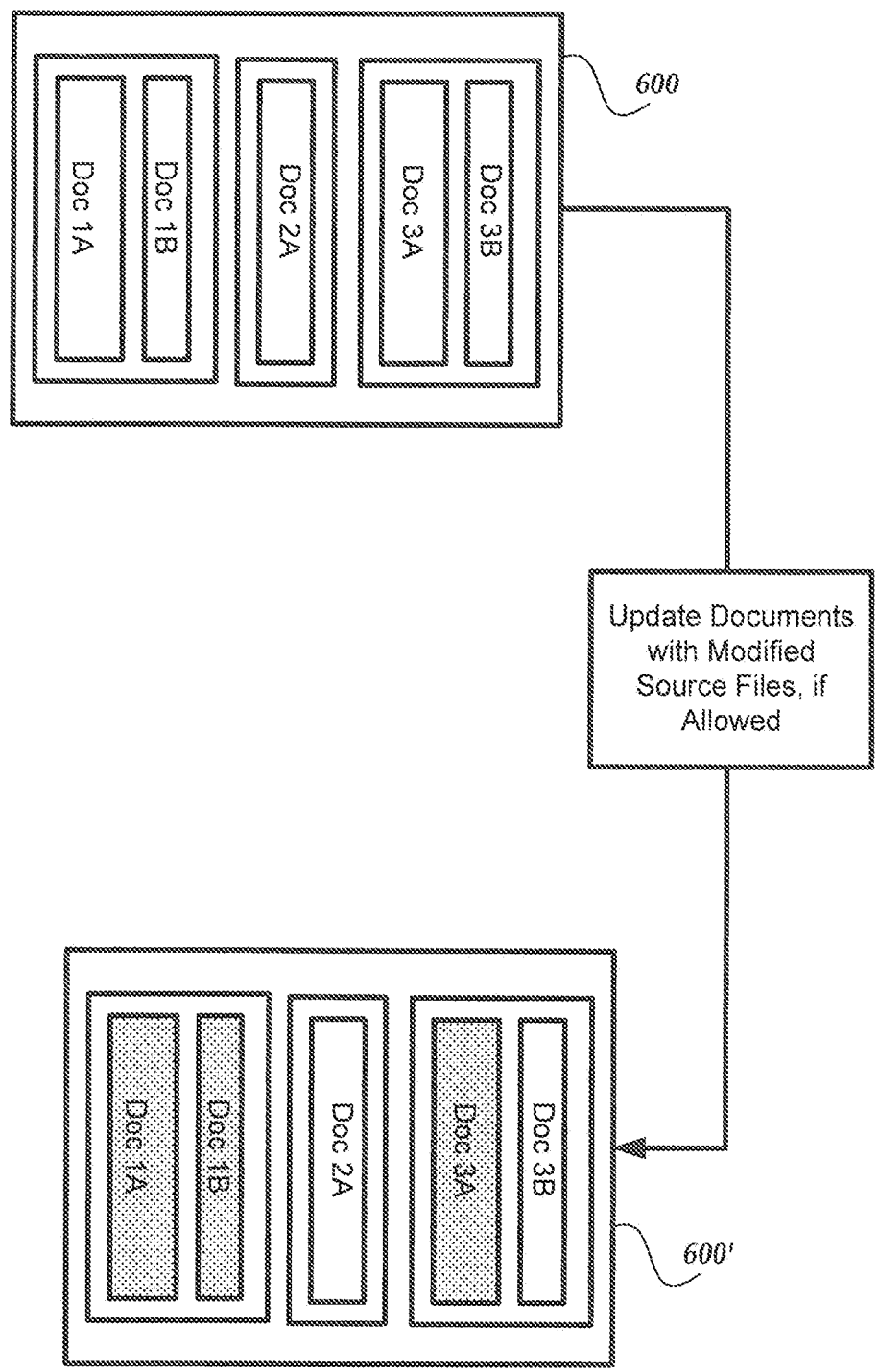
FIG. 6 is a schematic representation of one embodiment of a method of updating at least some documents in a binder file using modified source files, according to the invention.

FIG. 6 is a schematic representation of a rule based on the updating of the binder file 600 to form a modified binder file 600' by updating, if allowed, documents corresponding to source documents that have been modified since a particular date. The metadata associated with the documents Doc 1A, Doc 1B, Doc 2A, Doc 3A, and Doc 3B includes a source file location and a date when the document in the binder file was last modified (or when it was added to the binder file if the document was never modified.) In this particular example, document Doc 3B has metadata tag indicating that it never be updated within the binder file.

When a user requests that the binder file be updated (or when a binder file update is triggered as a part of an automated process) the current versions of the source documents are compared with the document metadata within the binder. Documents within the binder that were derived from source documents that have been modified since they were originally inserted are replaced with the later source documents, as indicated in FIG. 6 by shading of documents Doc 1A, Doc 1B, and Doc 3A. If the source file of a document has not been modified (e.g., Doc 3B) or the document is tagged to not be updated (e.g., Doc 2A), then the document is not updated.

The benefit of many of these features is the ability to simultaneously manage all documentation associated with a task or project using a binder file and its associate computer applications while also using the binder file as a dashboard for managing the task or project itself. There are many instances where a user creates similar documents for distribution many times, or where the user delivers a complex, structured document in a very short time. The ability to update a binder from the latest versions of external documents enables these scenarios to be addressed very easily by the user.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method of presenting documents, the method comprising:
   providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file if the document has been updated, wherein each document has been created individually and added to the single file;
   automatically, without user request, initiation, or intervention, updating the single file using a computer application program to review the time indicator of at least one of the plurality of documents in the single file and update that document if an updated version of that document is available to the computer application program, wherein updating the single file comprises automatically, without user request, initiation, or intervention, updating the single file using the computer application program to review the time indicator of each of the plurality of documents in at least one section of the single file and update that document if an updated version of that document is available to the computer application program;
   displaying a graphical interface that appears as a notebook binder; and
   displaying a portion of at least one of the plurality of documents on a graphical page of the notebook binder of the graphical interface.

2. The method of claim 1, wherein the time indicator for a respective one of the plurality of documents indicates, if that document has not been updated, when that document was added to the single file or when that document was created.

3. The method of claim 1, further comprising automatically updating a change history document in the single file when at least one of the plurality of documents is updated.

4. The method of claim 3, further comprising automatically updating a change history document in the single file when a document is added to the single file.

5. The method of claim 1, further comprising automatically generating or updating a table of contents document when a document is added to the single file.

6. The method of claim 1, further comprising periodically, and without user request, selecting a revision date and print-

9 ing each one of the plurality of documents that has been added to the single file since the revision date.

7. The method of claim 6, further comprising periodically, and without user request, printing each one of the plurality of documents updated in the single file since the revision date.

8. The method of claim 1, wherein at least one of the plurality of documents is designated as a document not to be updated and wherein the computer application program is configured and arranged to not update that document even if an updated version of that document is available to the computer application program.

9. The method of claim 1, wherein updating the single file comprises automatically, without user request, initiation, or intervention, updating the single file using the computer application program to review the time indicator of each of the plurality of documents of the single file and update that document if an updated version of that document is available to the computer application program.

10. The method of claim 1, wherein updating the single file comprises updating the single file automatically on a regular periodic basis using the computer application program to, without user request, initiation, or intervention, review the time indicator of at least one of the plurality of documents in the single file and update that document if an updated version of that document is available to the computer application program.

11. A method of presenting documents, the method comprising:
providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file or added to the single file if that document has not be updated, wherein each document has been created individually and added to the single file;
selecting a cut-off date;
automatically, without user request, initiation, or intervention, updating the single file by using a computer application program to review the time indicator at least one of the plurality of documents in the single file and delete that document if the time indicator of that document is prior to the cut-off date, wherein updating the single file comprises automatically, without user request, initiation, or intervention, updating the single file by using the computer application program to review the time indicator of each of the plurality of documents in at least one section of the single file and delete that document if the time indicator of that document is prior to the cut-off date;
displaying a graphical interface that appears as a notebook binder; and
displaying a portion of at least one of the plurality of documents on a graphical page of the notebook binder of the graphical interface.

12. The method of claim 11, wherein updating the single file comprises automatically, without user request, initiation, or intervention, updating the single file by using the computer application program to review the time indicator of each of the plurality of documents of the single file and delete that document if the time indicator of that document is prior to the cut-off date.

10

13. The method of claim 11, further comprising automatically updating a change history document in the single file when at least one of the plurality of documents is deleted.

14. The method of claim 13, further comprising automatically updating a change history document in the single file when a document is added to the single file.

15. The method of claim 11, further comprising automatically updating a table of contents document when a document is deleted from the single file.

16. The method of claim 11, wherein updating the single file comprising updating the single file automatically on a regular periodic basis by using the computer application program to, without user request, initiation, or intervention, review the time indicator at least one of the plurality of documents in the single file and delete that document if the time indicator of that document is prior to the cut-off date.

17. A non-transitory computer readable storage medium having processor-executable instructions, the processor-executable instructions when installed onto a system enable the system to perform actions, comprising:
providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file if the document has been updated, wherein each document is created individually and added to the single file, wherein each document has been created individually and added to the single file;
automatically, without user request, initiation, or intervention, updating the single file using a computer application program to review the time indicator of at least one of the plurality of documents in the single file and update that document if an updated version of that document is available to the computer application program, wherein updating the single file comprises automatically, without user request, initiation, or intervention, updating the single file using the computer application program to review the time indicator of each of the plurality of documents in at least one section of the single file and update that document if an updated version of that document is available to the computer application program;
displaying a graphical interface that appears as a notebook binder; and
displaying a portion of at least one of the plurality of documents on a graphical page of the notebook binder of the graphical interface.

18. A non-transitory computer readable storage medium having processor-executable instructions, the processor-executable instructions when installed onto a system enable the system to perform actions, comprising:
providing a single file comprising a plurality of documents, an identifier for each of the plurality of documents, an indicator for each of the plurality of documents to indicate in which one of a plurality of predefined sections that document belongs and to indicate a position of that document in that section, and a time indicator for each of the plurality of documents to indicate when that document was last updated within the single file or added to the single file if that document has not be updated, wherein each document has been created individually and added to the single file;
selecting a cut-off date;

automatically, without user request, initiation, or intervention, updating the single file by using a computer application program to review the time indicator at least one of the plurality of documents in the single file and delete that document if the time indicator of that document is prior to the cut-off date, wherein updating the single file comprises automatically, without user request, initiation, or intervention, updating the single file by using the computer application program to review the time indicator of each of the plurality of documents in at least one section of the single file and delete that document if the time indicator of that document is prior to the cut-off date;

displaying a graphical interface that appears as a notebook binder; and displaying a portion of at least one of the plurality of documents on a graphical page of the notebook binder of the graphical interface.

\* \* \* \* \*